United States Patent
Miura et al.

(10) Patent No.: US 7,164,421 B2
(45) Date of Patent: Jan. 16, 2007

(54) IMAGE GENERATION SYSTEM, PROGRAM, AND INFORMATION STORAGE MEDIUM

(75) Inventors: Kouichi Miura, Yokohama (JP); Yuichiro Okamura, Yokohama (JP)

(73) Assignee: Namco Bandai Games, Inc., Tokyo (JP)

( * ) Notice: Subject to any disclaimer, the term of this patent is extended or adjusted under 35 U.S.C. 154(b) by 17 days.

(21) Appl. No.: 10/841,602

(22) Filed: May 10, 2004

(65) Prior Publication Data

US 2005/0001835 A1 Jan. 6, 2005

(30) Foreign Application Priority Data

May 12, 2003 (JP) .............................. 2003-133757

(51) Int. Cl.
*G06T 15/50* (2006.01)
*G06T 15/60* (2006.01)

(52) U.S. Cl. ...................................... 345/426; 345/473

(58) Field of Classification Search ................ 345/592, 345/426, 589, 422; 582/274
See application file for complete search history.

(56) References Cited

U.S. PATENT DOCUMENTS

| | | | |
|---|---|---|---|
| 6,515,674 B1 * | 2/2003 | Gelb et al. ................... | 345/582 |
| 6,879,328 B1 * | 4/2005 | Deering ....................... | 345/592 |
| 2002/0122036 A1 * | 9/2002 | Sasaki ......................... | 345/422 |
| 2002/0123380 A1 * | 9/2002 | Hirai et al. ................... | 463/31 |
| 2003/0011610 A1 | 1/2003 | Kitsutaka | |

FOREIGN PATENT DOCUMENTS

| | | |
|---|---|---|
| JP | A 2001-229403 | 8/2001 |
| JP | A 2001-325605 | 11/2001 |
| JP | A 2003-91737 | 3/2003 |

OTHER PUBLICATIONS

Matthias Zwicker et al.; "Surface Splatting"; Computer Graphics Proceedings, Annual Conference Series, 2001; XP-001049907; ACM Siggraph 2001, Aug. 12-17, 2001; pp. 371-378.
David Elbert et al.; "Volume Illustration: Non-Photorealistic Rendering of Volume Models", IEEE; 2000; pp. 195-202.

* cited by examiner

*Primary Examiner*—Mark Zimmerman
*Assistant Examiner*—Kevin Xu
(74) *Attorney, Agent, or Firm*—Oliff & Berridge PLC

(57) ABSTRACT

An image generation system, program, and information storage medium can realistically represent reflection of light on a given object or topographic surface with a reduced computation load. The image generation system includes a section which assigns, to a given object or topographic surface disposed in a virtual three-dimensional space, a virtual object which has at least one of nonuniform brightness or color and is used for representing a light reflection effect on the object or topographic surface; a section which determines a position of the virtual object so that the virtual object moves to follow a virtual camera or player's character, and disposes the virtual object at the determined position; and a section which generates an image of the virtual three-dimensional space viewed from the virtual camera by performing translucent blending processing of the object or topographic surface and the virtual object assigned to the object or topographic surface.

22 Claims, 13 Drawing Sheets

IMAGE GENERATION SYSTEM, PROGRAM, AND INFORMATION STORAGE MEDIUM

Japanese Patent Application No. 2003-133757, filed on May 12, 2003, is hereby incorporated by reference in its entirety.

BACKGROUND OF THE INVENTION

The present invention relates to an image generation system, a program, and an information storage medium.

A game system which generates an image viewed from a given viewpoint in an object space, which is a virtual three-dimensional space, has been known. This game system is very popular as a system which allows the experience of so-called virtual reality.

In this game system, it is an important technical subject to generate a more real image in order to improve the sense of virtual reality of the player.

FIG. 13 is illustrative of reflection of light.

Incident light is reflected on a reflection surface at a reflection angle $\theta'3$ which is at the same angle as an incident angle $\theta3$ with respect to the normal direction of the surface, and enters a viewpoint 210.

Taking reflected light rays r1, r2, and r3 which enter the viewpoint 210 after being reflected on the reflection surface at reflection points P1, P2, and P3, respectively, since the reflected light ray r3 reflects light from a light source 220, the reflected light ray r3 is brighter (has higher brightness). Therefore, in the case of generating an image viewed from the viewpoint, the reflection surface (topography, for example) is brighter near the reflection point P3 than near the reflection points P1 and P2.

In order to represent such a reflection of light, it is necessary to compute the reflected light corresponding to the positional relationship between the viewpoint and the light source.

In particular, the processing load of computing the reflected light in real time corresponding to the position of the viewpoint, which is interactively changed by the input of the player, is too heavy for a game system with limited hardware resources.

BRIEF SUMMARY OF THE INVENTION (1) An image generation method according to a first aspect of the present invention includes:

assigning, to a given object or a given topographic surface disposed in a virtual three-dimensional space, a virtual object which has at least one of nonuniform brightness or nonuniform color and is used for representing a light reflection effect on the object or the topographic surface, and storing the virtual object in a storage section;

determining a position of the virtual object so that the virtual object moves to follow a virtual camera or a player's character, and disposing the virtual object at the determined position; and generating an image of the virtual three-dimensional space viewed from the virtual camera by performing translucent blending processing of the object or the topographic surface and the virtual object assigned to the object or the topographic surface.

(2) A program according to a second aspect of the present invention causes a computer to implement processing of:

assigning, to a given object or a given topographic surface disposed in a virtual three-dimensional space, a virtual object which has at least one of nonuniform brightness or nonuniform color and is used for representing a light reflection effect on the object or the topographic surface;

determining a position of the virtual object so that the virtual object moves to follow a virtual camera or a player's character, and disposing the virtual object at the determined position; and generating an image of the virtual three-dimensional space viewed from the virtual camera by performing translucent blending processing of the object or the topographic surface and the virtual object assigned to the object or the topographic surface.

(3) An image generation system according to a third aspect of the present invention includes:

a virtual object assigning section which assigns, to a given object or a given topographic surface disposed in a virtual three-dimensional space, a virtual object which has at least one of nonuniform brightness or nonuniform color and is used for representing a light reflection effect on the object or the topographic surface;

a virtual object disposing section which determines a position of the virtual object so that the virtual object moves to follow a virtual camera or a player's character, and disposes the virtual object at the determined position; and an image generation section which generates an image of the virtual three-dimensional space viewed from the virtual camera by performing translucent blending processing of the object or the topographic surface and the virtual object assigned to the object or the topographic surface.

DETAILED DESCRIPTION OF THE EMBODIMENT

Figure 1:
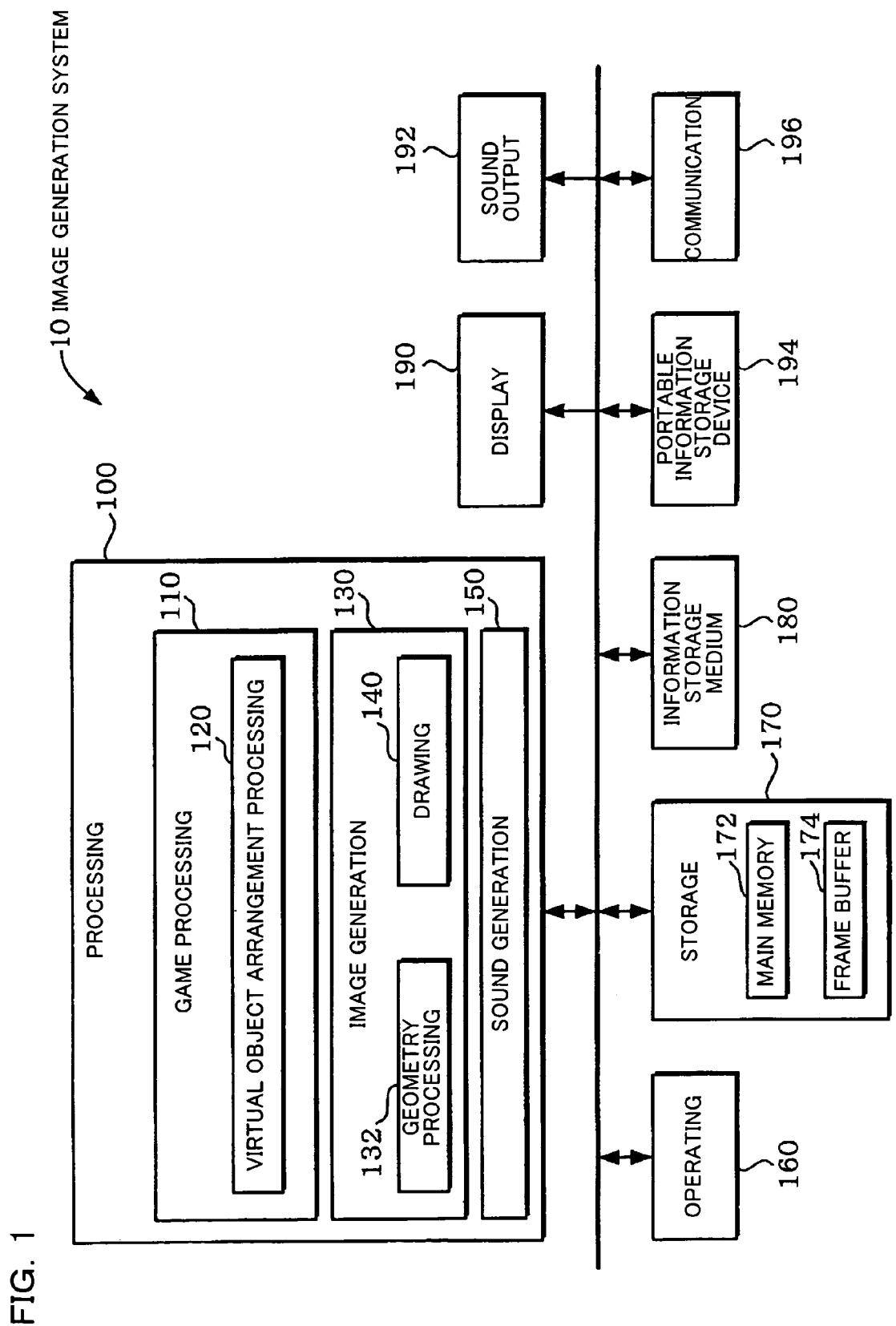
FIG. 1 is an example of a functional block diagram of an image generation system (game system, for example) of an embodiment of the present invention.

The embodiments of the present invention are described below with reference to the drawings.

Note that the embodiments described hereunder do not in any way limit the scope of the invention defined by the claims laid out herein. Note also that all of the elements of these embodiments should not be taken as essential requirements to the means of the present invention.

1. Features (1) An image generation system according to an embodiment of the present invention includes:

a virtual object assigning section which assigns, to a given object or a given topographic surface disposed in a virtual three-dimensional space, a virtual object which has at least one of nonuniform brightness or nonuniform color and is used for representing a light reflection effect on the object or the topographic surface;

a virtual object disposing section which determines a position of the virtual object so that the virtual object moves to follow a virtual camera or a player's character, and disposes the virtual object at the determined position; and an image generation section which generates an image of the virtual three-dimensional space viewed from the virtual camera by performing translucent blending processing of the object or the topographic surface and the virtual object assigned to the object or the topographic surface.

A program according to another embodiment of the present invention is a computer-executable program (program embodied on an information storage medium or a carrier wave), and causes a computer to function as each of the above sections. An information storage medium according to a further embodiment of the present invention is a computer-readable (usable) information storage medium and includes a program which causes a computer to function as each of the above sections. An image generation method according to a still further embodiment of the present invention includes performing the processing of each of the above sections.

The expression "represents a light reflection effect" means representing a change in color or brightness of the object or the topographic surface due to reflection of light, for example.

The expression "assigns a virtual object" means generating model information on the virtual object and storing the model information in the storage section, for example.

The topographic surface may be a single topographical object for representing topography or the like, such as a road surface object, a wall object, or a water surface object, or may be an assembly of a plurality of objects for representing topography or the like. Specifically, one virtual object may be assigned to one object, or a plurality of virtual objects may be assigned to one object. One virtual object may be assigned to a plurality of objects.

Information about the object to which the virtual object is assigned may be provided as model information on the virtual object, or provided as model information on the corresponding object, or provided as an algorithm of an image generation program.

A polygon of the virtual object may include only a portion in which the virtual object is translucently blended to change the color or brightness. Therefore, it is unnecessary to provide polygon information to the area translucently blended with the area of the object or the topographic surface in which the color or brightness is allowed to remain unchanged.

An object in a state in which the polygon is not provided may be assigned as the virtual object.

According to the present invention, reflection of light from a light source (sunlight, for example) on the object or the topographic surface can be represented by assigning the virtual object and performing the translucent blending processing of the object or the topographic surface and the virtual object.

This makes it unnecessary to compute the reflected light corresponding to the positional relationship between the viewpoint and the light source, whereby reflection can be represented with a reduced computation load.

(2) With the image generation method, the program, the information storage medium and the image generation system according to the embodiments of the present invention, brightness or color of a predetermined area of the virtual object may be set so that a portion disposed further from a player or the virtual camera has higher brightness or brighter color.

An effect in which the reflectance of the area away from the viewpoint is higher than the reflectance of the area closer to the viewpoint can be represented by applying the present invention to a road surface.

Therefore, a Fresnel effect in which reflection becomes higher as the angle formed by the normal of the surface and a line-of-sight vector (vector from viewpoint to vertex) is closer to 90° can be represented by applying the present invention to a road surface.

(3) With the image generation method, the program, the information storage medium and the image generation system according to the embodiments of the present invention, a background color may be mixed into the virtual object.

An image of the object or the topographic surface which reflects the background color such as the color of the sky can be generated.

A bright sky color (with high brightness) may be provided to the virtual object in the case where it is desired to represent fine weather or the midday sky, and a red sky color may be provided to the virtual object in the case where it is desired to represent sunset, for example.

(4) With the image generation method, the program, the information storage medium and the image generation system according to the embodiments of the present invention, the virtual object may be assigned to have a size to be included in a viewing volume of the virtual camera.

The virtual object moves to follow the virtual camera or the player's character. However, if the viewing volume includes the virtual object in a state in which the virtual object is disposed in the viewpoint coordinate system, the virtual object, the given object or topography can be necessarily included in the viewing volume, in the case where the position of the given object or topography is within the field of view by disposing the virtual object at the position of the viewpoint (position of virtual camera), for example. Therefore, since the virtual object may be disposed at a predetermined position (position of viewpoint, for example) irrespective of the positional relationship with the position of the given object or topography, the processing can be simplified.

(5) With the image generation method, the program, the information storage medium and the image generation system according to the embodiments of the present invention, the virtual object may have a shape of a part of a spherical surface or a shape of a bowl.

(6) With the image generation method, the program, the information storage medium and the image generation system according to the embodiments of the present invention, in a case of representing reflection on a plurality of objects or topographic surfaces, the virtual object may be assigned to each of the plurality of objects or topographic surfaces.

A virtual object having a shape corresponding to the shape or inclination of the objects or topographic surfaces may be assigned to each of the objects or topographic surfaces.

The reflection state differs between the case where the inclination of the surface is perpendicular to the light source and the case where the inclination of the surface is parallel to the light source. Reflection of light which reflects the inclination of the object to the light source can be represented by providing an object for representing reflected light to each object.

(7) With the image generation method, the program, the information storage medium and the image generation system according to the embodiments of the present invention, a translucent blending coefficient with the virtual object may be stored for each vertex as model information of the object or the topographic surface, and the translucent blending processing of the object or the topographic surface and the virtual object may be performed using the translucent blending coefficient.

The translucent blending coefficient refers to information which is equivalent to translucency information or transparency information and is stored for each pixel or stored while being associated with each pixel. This information is set for each definition point of the object, and represents transparency (equivalent to opacity or translucency) as extra information (alpha value) other than color information, for example. In the case where the translucent blending coefficient represents transparency information as extra information, a blending processing method such as translucent blending (alpha-blending) using the translucent blending coefficient, additive (alpha-additive) translucent processing using the translucent blending coefficient, or subtractive (alpha-subtractive) translucent processing using the translucent blending coefficient can be given.

In the case of additive translucent processing, the following blending processing using the translucent blending coefficient ($\alpha$) is performed.

$$RQ = R1 + \alpha \times R2$$

$$GQ = G1 + \alpha \times G2$$

$$BQ = B1 + \alpha \times B2$$

R1, G1, and B1 are R, G, and B components of the color (brightness) of the image after geometry processing, which has been drawn in a drawing buffer, and R2, G2, and B2 are R, G, and B components of the color of the drawing image. RQ, GQ, and BQ are R, G, and B components of the color of the image generated by alpha-blending. As the alpha value, the alpha value of the given image after geometry processing or the alpha value of the drawn original image may be used.

(8) With the image generation method, the program, the information storage medium and the image generation system according to the embodiments of the present invention, a translucent blending coefficient with the virtual object may be stored for each pixel as information of a texture to be mapped on the object or the topographic surface, and the translucent blending processing of the object or the topographic surface, on which the texture is mapped, and the virtual object may be performed using the translucent blending coefficient.

The translucent blending coefficient refers to information which is equivalent to translucency information or transparency information and is stored for each pixel or stored while being associated with each pixel. This information is set for each definition point of the object, and represents transparency (equivalent to opacity or translucency) as extra information (alpha value) other than color information, for example. In the case where the translucent blending coefficient represents transparency information as extra information, a blending processing method such as translucent blending (alpha-blending) using the translucent blending coefficient, additive (alpha-additive) translucent processing using the translucent blending coefficient, or subtractive (alpha-subtractive) translucent processing using the translucent blending coefficient can be given.

In the case of additive translucent processing, the following blending processing using the translucent blending coefficient ($\alpha$) is performed.

$$RQ = R1 + \alpha \times R2$$

$$GQ = G1 + \alpha \times G2$$

$$BQ = B1 + \alpha \times B2$$

R1, G1, and B1 are R, Q and B components of the color (brightness) of the image after geometry processing, which has been drawn in a drawing buffer, and R2, G2, and B2 are R, G, and B components of the color of the drawing image. RQ, GQ, and BQ are R, G, and B components of the color of the image generated by alpha blending. As the alpha value, the alpha value of the given image after geometry processing or the alpha value of the drawn original image may be used.

2. Configuration

FIG. 1 shows an example of a functional block diagram of an image generation system 10 (game system, for example) of an embodiment of the present invention.

In FIG. 1, it suffices that the present embodiment include at least a processing section 100 (or processing section 100 and storage section 170, or processing section 100, storage section 170, and information storage medium 180). Other blocks (operating section 160, display section 190, sound output section 192, portable information storage device 194, and communication section 196, for example) may be provided as arbitrary constituent elements.

The processing section 100 controls the entire system, issues instructions to each block in the system, and performs various types of processing such as game processing, image processing, or sound processing. The function of the processing section 100 may be realized by hardware such as various processors (CPU, DSP, or the like) or ASIC (gate array or the like), or by a given program (game program).

The operating section 160 allows a player to input operation data. The function of the operating section 160 may be realized by hardware such as a lever, button, and housing.

The storage section 170 includes a main memory 172 (main storage section), a frame buffer 174 (drawing buffer), and the like, and provides a work area for the processing section 100, the communication section 196, and the like. The function of the storage section 170 may be realized by hardware such as a RAM.

The information storage medium 180 (computer-usable storage medium) stores information such as a program or data. The function of the information storage medium 180 may be realized by hardware such as an optical disk (CD or DVD), magneto-optical disk (MO), magnetic disk, hard disk, magnetic tape, or memory (ROM). The processing section 100 performs various types of processing of the present invention (present embodiment) based on the information stored in the information storage medium 180. Specifically, information (program or data) for executing the means (blocks included in the processing section 100, in particular) of the present invention (present embodiment) is stored in the information storage medium 180.

A part or the entirety of the information stored in the information storage medium 180 is transferred to the storage section 170 when power is supplied to the system, for example. The information stored in the information storage medium 180 includes at least one of a program for performing the processing of the present invention, image data, sound data, shape data of a display object, table data, list data, information for issuing instructions for the processing of the present invention, information for performing the processing according to the instructions, and the like.

The display section 190 outputs an image generated by the present embodiment. The function of the display section 190 may be realized by hardware such as a CRT, LCD, or head mount display (HMD).

The sound output section 192 outputs sound generated by the present embodiment. The function of the sound output section 192 may be realized by hardware such as a speaker.

The portable information storage device 194 stores personal data or saved data of the player and the like. As the portable information storage device 194, a memory card or a portable game device may be used.

The communication section 196 performs various types of control for communicating with the outside (host device or another image generation system, for example). The function of the communication section 196 may be realized by hardware such as various processors or communication ASIC, or by a program.

The program or data for executing the means of the present invention (present embodiment) may be distributed to the information storage medium 180 from an information storage medium included in a host device (server) through a network and the communication section 196. The use of the information storage medium of the host device (server) is included within the scope of the present invention.

The processing section 100 includes a game processing section 110, an intersection detection processing section 120 (shadow volume processing section), an image generation section 130, and a sound generation section 150.

The game processing section 110 performs various types of game processing such as coin (token) reception processing, mode setting processing, game procedure processing, selection screen setting processing, computation of the position and rotation angle (rotation angle around X, Y, or Z axis) of an object (one or a plurality of primitive surfaces), processing of causing an object to take motion (motion processing), computation of the position of a viewpoint (position of virtual camera) and the angle of the line of sight (rotation angle of virtual camera), processing of disposing an object such as a map object in an object space, hit check processing, computation of the game result (record), processing of allowing a plurality of players to play in a common game space, or game-over processing based on operation data from the operating section 160, personal data or saved data from the portable information storage device 194, a game program, and the like.

The game processing section includes a virtual object arrangement processing section 120.

The virtual object arrangement processing section 120 assigns, to a given object or topographic surface disposed in a virtual three-dimensional space, a virtual object which has at least one of nonuniform brightness or color and is used to represent a light reflection effect on the given object or topographic surface, determines the position of the virtual object so that the virtual object moves to follow a virtual camera or a player's character, and disposes the virtual object at the position determined.

In the case of representing reflection on a plurality of objects or topographic surfaces, the virtual object arrangement processing section 120 may provide and assign the virtual object to each of the objects or topographic surfaces.

The image generation section 130 generates an image viewed from the virtual camera (viewpoint) in the object space by performing various types of image processing according to instructions from the game processing section 110, and outputs the generated image to the display section 190.

The image generation section 130 functions as image generation means which generates an image of the virtual three-dimensional space viewed from the virtual camera by performing translucent blending processing of the given object or topographic surface and the virtual object assigned to the given object or topographic surface.

The image generation section 130 may read a translucent blending coefficient with the virtual object which is stored for each vertex as model information on the given object or topographic surface, and may perform the translucent blending processing of the given object or topographic surface and the virtual object using the translucent blending coefficient.

The image generation section 130 may read a translucent blending coefficient with the virtual object which is stored for each pixel as information on a texture to be mapped on the given object or topographic surface, and may perform the translucent blending processing of the given object or topographic surface on which the texture is mapped and the virtual object using the translucent blending coefficient.

The sound generation section 150 generates sound such as BGM, effect sound, or voice by performing various types of sound processing based on instructions from the game processing section 110, and outputs the generated sound to the sound output section 192.

The functions of the game processing section 110, the virtual object arrangement processing section 120, the image generation section 130, and the sound generation section 150 may be entirely realized by either hardware or a program. The functions of the game processing section 110, the virtual object arrangement processing section 120, the image generation section 130, and the sound generation section 150 may be realized by hardware and a program.

The image generation section 130 includes a geometry processing section 132 (three-dimensional computation section), and a drawing section 140 (rendering section).

The geometry processing section 132 performs various types of geometry processing (three-dimensional computation) such as a coordinate transformation, clipping processing, perspective transformation, or light source computation. In the present embodiment, object data (object vertex coordinates, vertex texture coordinates, brightness data, or the like) after the geometry processing (after perspective transformation) is stored and saved in the main storage section 172 in the storage section 170.

The drawing section 140 draws an object in the drawing buffer 174 based on the object data after the geometry processing (after perspective transformation) and the texture stored in the storage section 170. This enables an image viewed from the virtual camera (viewpoint) to be drawn (generated) in the object space in which the object moves.

In the drawing section 140, rendering processing of the intersection (overlapping section) with the given object which is set to be influenced by a volume object is performed by using the model information changed by intersection detection processing or by using a rendering method changed by the intersection detection processing.

The image generation system of the present embodiment may be a system exclusive for a single player mode in which only one player can play the game, or may be a system provided with a multi-player mode in which a plurality of players can play the game in addition to the single player mode.

In the case where a plurality of players play the game, game images and game sound provided to the players may be generated by using one terminal, or generated by using a plurality of terminals connected through a network (transmission line or communication line) or the like.

3. Feature and Processing of Present Embodiment

The features and processing of the present embodiment are described below with reference to the drawings.

Figure 2:
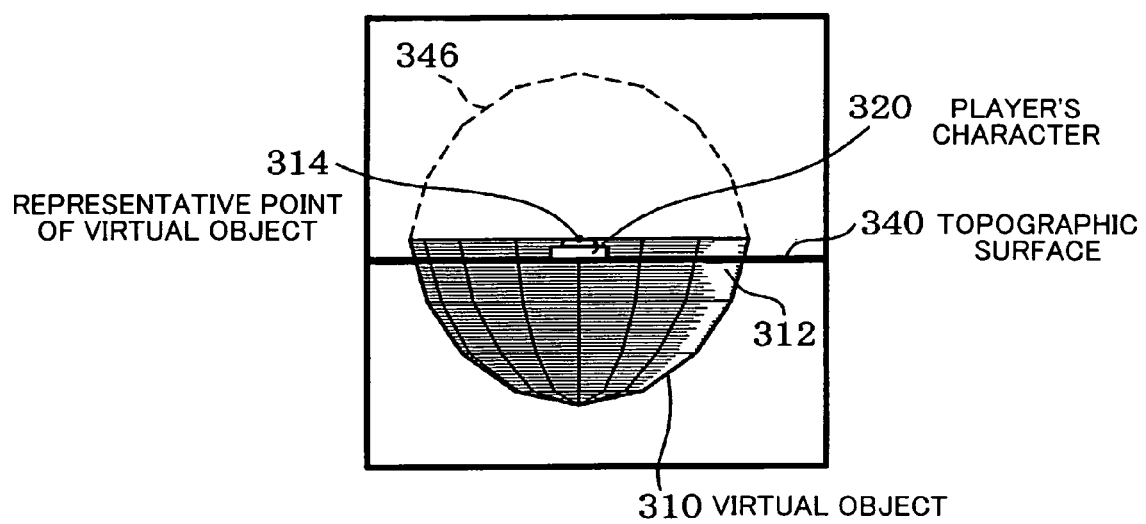
FIG. 2 is illustrative of a virtual object of an embodiment of the present invention.
Figure 3:
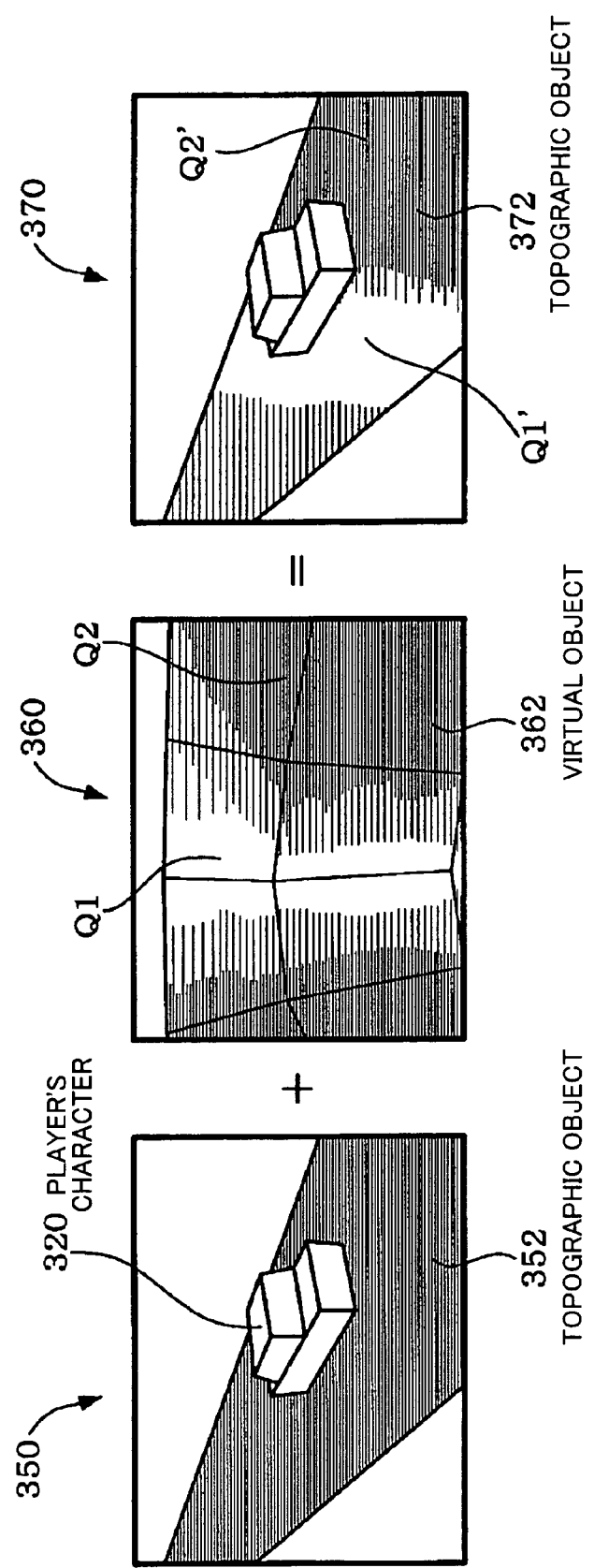
FIG. 3 is illustrative of translucent blending of a given object or topographic surface and a virtual object.

FIG. 2 is illustrative of a virtual object of the present embodiment, and FIG. 3 is illustrative of translucent blending of a given object or topographic surface and a virtual object.

In the present embodiment, a given object or topographic surface 340 is assigned a virtual object 310 which has at least either nonuniform brightness or color and is used to represent a light reflection effect (change in color or brightness due to reflection) on the given object or topographic surface (model information on the virtual object is provided). The position of the virtual object 310 is determined so that the virtual object 310 moves to follow a virtual camera or a player's character 320, and the virtual object is disposed at the position determined.

The virtual object 340 may be assigned in the shape formed by removing a part of the surface of a sphere 346 or in the shape of a bowl, as shown in FIG. 2.

In the case where the virtual object is formed in a hemispherical shape, the section of the hemisphere may be the given object or topographic surface 340.

The topographic surface 340 may be a single topographical object for representing topography or the like, or may be an assembly of a plurality of objects for representing topography or the like.

It suffices that the polygon of the virtual object include only a portion in which the virtual object is blended with the given object or topographic surface to change the color or brightness (near 312 in FIG. 2). Therefore, it is unnecessary to provide polygon information (polygon) to the area blended with the area of the given object or topographic surface in which the color or brightness is allowed to remain unchanged (area other than the area 312 of the virtual object 310).

An object in a state in which the polygon is not provided (object consisting only of a part 312 of the virtual object 310) may be used as the virtual object.

The position of the virtual object 310 may be determined so that the virtual object 310 moves to follow the virtual camera or the player's character 320 by determining the position coordinates of the virtual object in the object space based on the position coordinates of the virtual camera or the player's character 320, for example. The position coordinates of the virtual object in the object space may be the same as the position coordinates of the virtual camera 330 or the player's character 320, or values obtained by adding or subtracting a predetermined offset value to or from the position coordinates of the virtual camera 330 or the player's character 320 may be set as the position coordinates of the virtual object in the object space, for example.

The translucent blending processing of the given object or topographic surface 340 and the virtual object 310 assigned to the given object or topographic surface 340 is performed as shown in FIG. 3 to generate an image of the virtual three-dimensional space including the given object or topographic surface object viewed from the virtual camera.

A numeral 350 denotes an image obtained by perspective transformation of a player's moving object 354 disposed in the virtual three-dimensional space and a topographical object 352 for generating a road image.

A numeral 360 denotes an image obtained by perspective transformation of a virtual object 362 disposed at a position to which the virtual object 362 has moved to follow the virtual camera 330. The virtual object is assigned to the topographical object 352 for generating a road image. The model information on the virtual object may be provided with information for specifying an object to which the virtual object corresponds (object which is translucently blended with the virtual object).

The virtual object has nonuniform brightness or color as denoted by 362. Specifically, Q1 has higher brightness or brighter color (color set to represent reflection on the color of the corresponding point of the topographical object) than Q2.

A numeral 370 denotes an image after performing translucent blending processing of the virtual object and the topographical object 352. An image in which reflection occurs to a greater extent at a point Q'1 corresponding to the point Q1 in 360 than a point Q'2 corresponding to the point Q2 can be generated by translucent blending of the virtual object and the road surface object.

Figure 4:
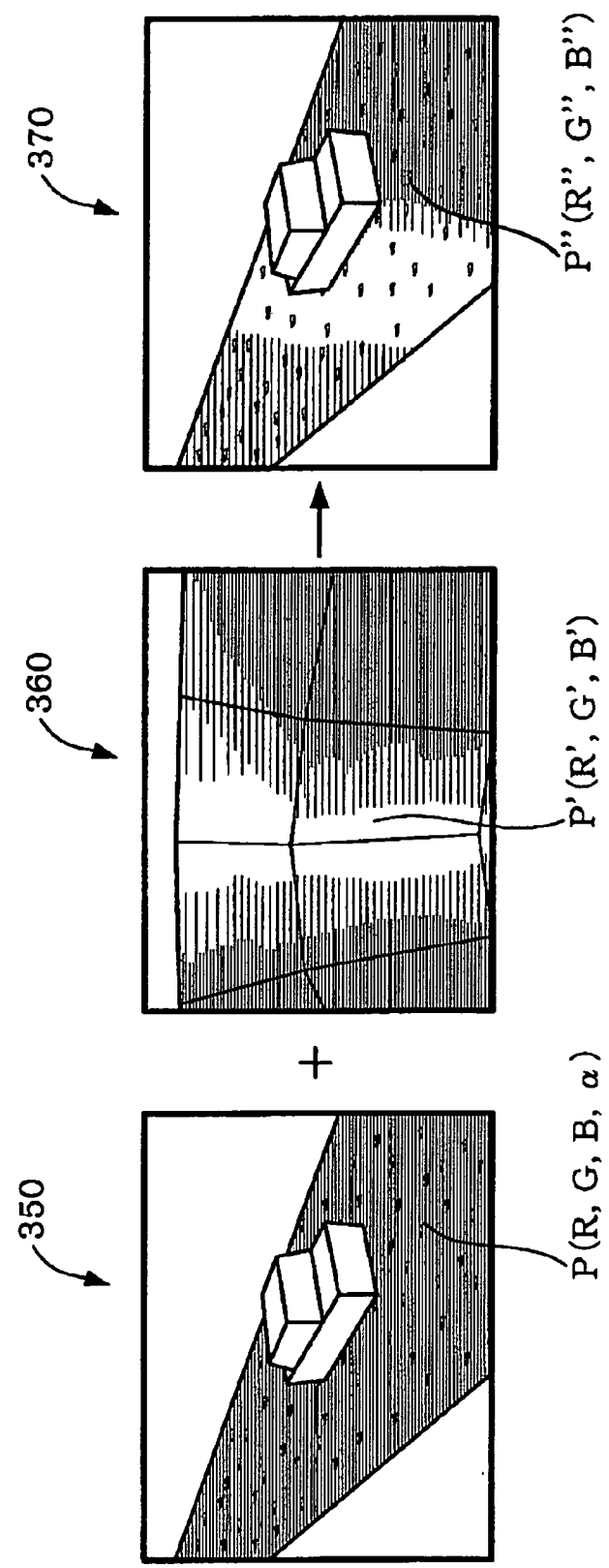
FIG. 4 is illustrative of alpha-additive processing which is an example of translucent blending of a given object or topographic surface and a virtual object.

FIG. 4 is illustrative of alpha-additive processing which is an example of translucent blending of the given object or topographic surface and the virtual object.

350, 360, and 370 are the same as described with reference to FIG. 3. P, P', and P'' in 350, 360, and 370 denote pixels which overlap when drawing. If the pixel value (RGB value, alpha value) of the pixel P on the road surface in 350 is denoted by $(R, G, B, \alpha)$, the pixel value (RGB value) of the pixel P' on the virtual object in 360 is denoted by $(R', G', B')$, and the pixel value (RGB value) of the pixel P'' of an image after alpha-addition in 370 is denoted by $(R'', G'', B'')$, $R''$, $G''$, and $B''$ can be represented by the following equations.

$$R'' = R + R' \times \alpha$$

$$G'' = G + G' \times \alpha$$

$$B'' = B + B' \times \alpha$$

If the pixel value of the pixel P is (40, 50, 40) and $\alpha=0.2$, and the pixel value of the pixel P' on the virtual object is (244, 244, 230), the pixel value of the pixel P'' of the image after alpha-addition is computed to be (88, 96, 6) by using the above equations, for example.

The RGB value of the pixel P' is the color set to represent reflection on the color of the corresponding point (P in 350) of the topographic object (road surface). Therefore, the pixel P' may be set so that the corresponding point has higher brightness while maintaining the RGB value and the hue the same. In the case where it is desired to reflect the background color (color of the sky, for example), the RGB value which reflects the background color may be set.

The alpha value, which is the translucent blending coefficient used for translucent blending processing such as alpha-additive processing, may be set for each vertex as model information on the given object or topographic surface (road surface object, for example), and the translucent blending processing of the given object or topographic surface and the virtual object may be performed using the translucent blending coefficient.

This enables translucent blending to be controlled while allowing the translucent blending coefficient to differ between each vertex of the given object or topographic surface (road surface object, for example).

The translucent blending processing may be omitted in the region in which the alpha value is not set.

The alpha value, which is the translucent blending coefficient used for translucent blending processing such as alpha-additive processing, may be set for each pixel as information on a texture to be mapped on the given object or topographic surface, and the translucent blending processing of the given object or topographic surface on which the texture is mapped and the virtual object may be performed using the translucent blending coefficient.

This enables translucent blending to be controlled while allowing the translucent blending coefficient to differ between each pixel of the given object or topographic surface (road surface object, for example).

Figure 5B:
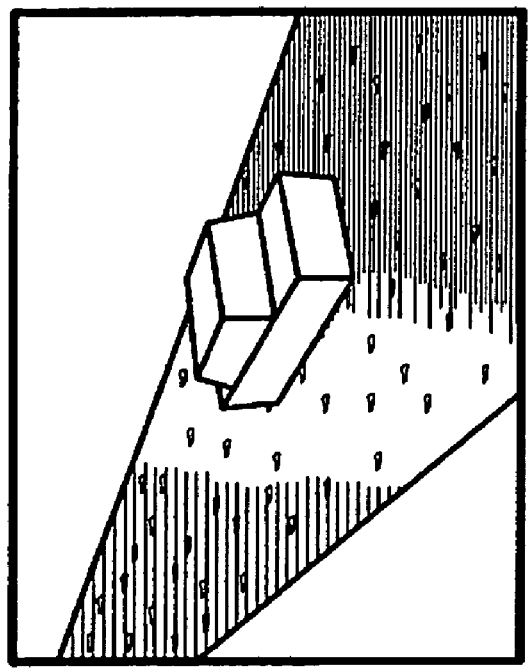
FIGS. 5A and 5B respectively show an image in which a texture is mapped on a road surface object and an image obtained by performing translucent blending processing of the road surface object on which the texture is mapped and a virtual object.
Figure 5A:
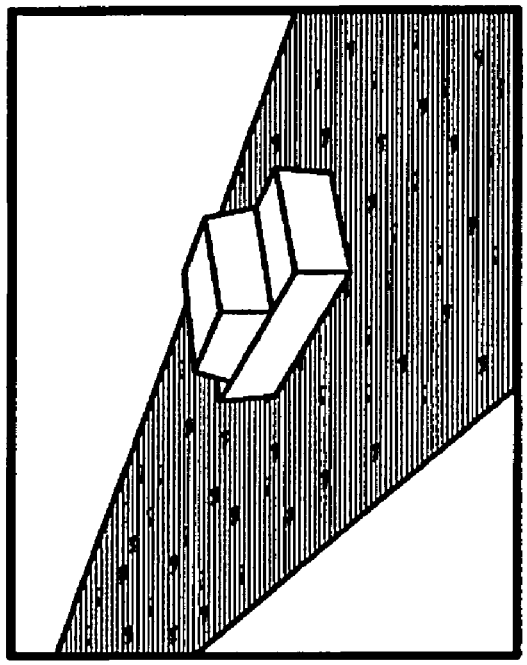

FIG. 5A shows an image in which a texture is mapped on the road surface object, and FIG. 5B shows an image obtained by performing translucent blending processing of the road surface object on which the texture is mapped and the virtual object.

Reflection can be represented on an image with the feel of the material by providing the translucent blending coefficient to the texture.

In the case of representing reflection on a plurality of objects or topographic surfaces, the virtual object may be provided and assigned to each of the objects or topographic surfaces.

Figure 6:
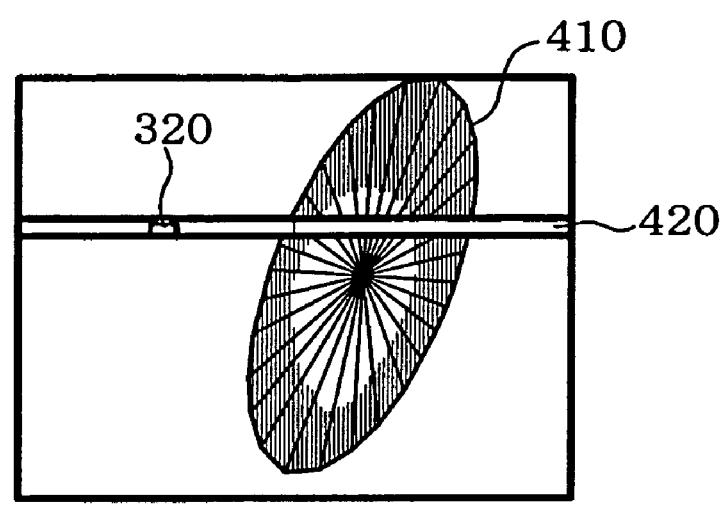
FIG. 6 is an example of a virtual object of another shape.
Figure 7:
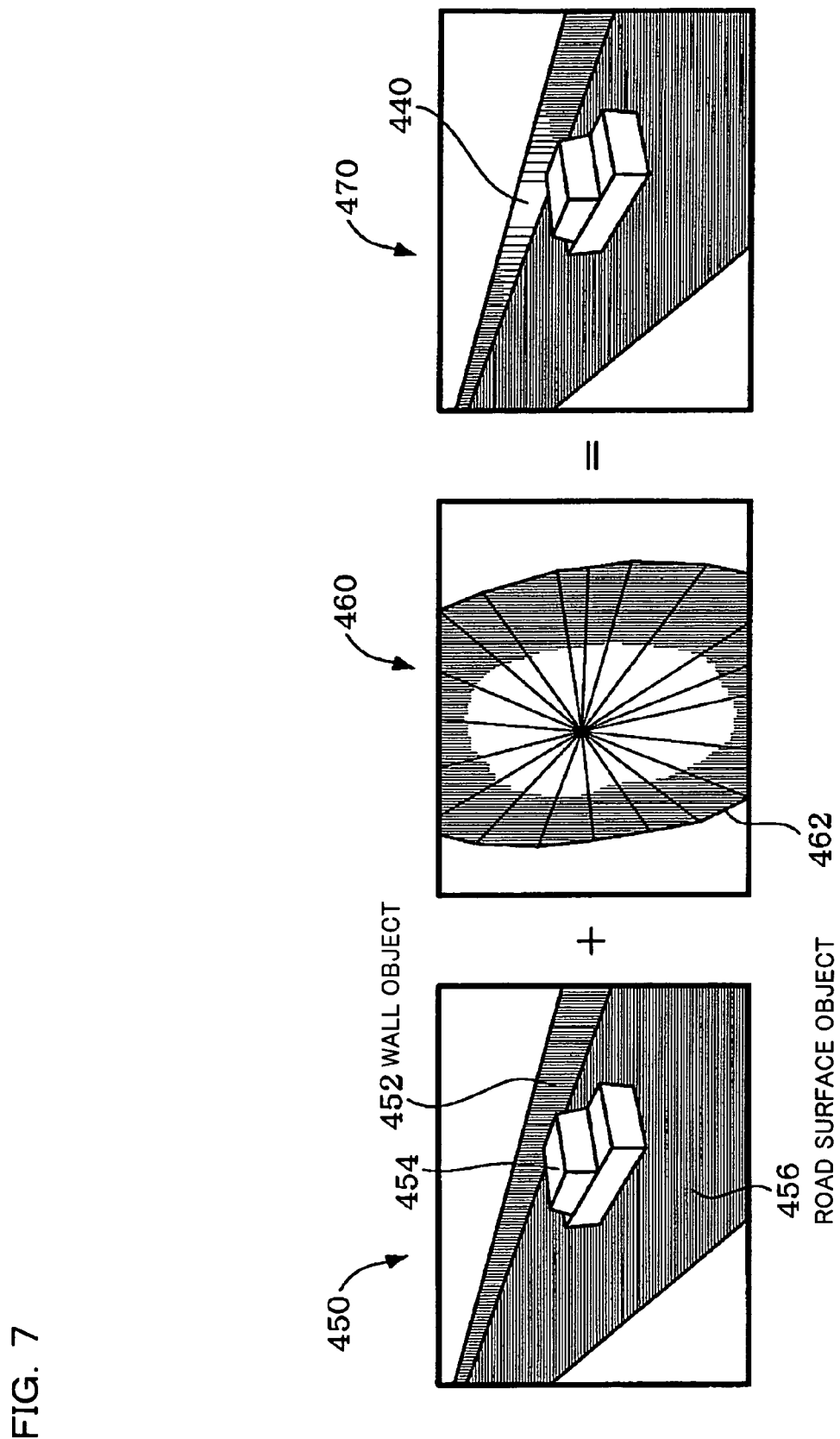
FIG. 7 shows a state in which a given object or topographic surface and a virtual object of another shape are translucently blended.

FIG. 6 is an example of a virtual object of another shape, and FIG. 7 shows a state in which a given object or topographic surface and the virtual object of another shape are translucently blended.

FIG. 6 shows a state in which a disk-like virtual object 410 is assigned to a wall object 420 (given object or topographic surface) on the roadside. The disk-like virtual object 410 has at least one of nonuniform brightness or color, and represents a light reflection effect (change in color or brightness due to reflection) on the wall object 420 (given object or topographic surface) on the roadside.

The translucent blending processing of the wall object 420 (given object or topographic surface) and the virtual object 410 assigned to the wall object 420 is performed as shown in FIG. 7 to generate an image of the virtual three-dimensional space, including the given object or topographic surface object, viewed from the virtual camera.

A numeral 450 denotes an image obtained by perspective transformation of a player's moving object 454 disposed in the virtual three-dimensional space, a topographic object 456 for generating a road image, and a wall object 452 for generating a wall image.

A numeral 460 denotes an image obtained by perspective transformation of a virtual object 462 disposed at a position to which the virtual object 462 has moved to follow the virtual camera. The virtual object is assigned to the wall object 452 for generating a wall image.

Since the wall object 420 (given object or topographic surface) on the roadside differs in inclination to the light source (sun disposed in the virtual three-dimensional space, for example) from the road surface object (456 in FIG. 7, for example), the reflection state also differs. Therefore, the disk-like virtual object 410 as shown in FIG. 6 may be provided in the case of representing reflection on the wall object, and the bowl-shaped virtual object 310 as shown in FIG. 2 may be provided in the case of representing reflection on the road surface object, for example.

The reflection state differs between the case where the inclination of the surface is perpendicular to the light source and the case where the inclination of the surface is parallel to the light source. Reflection of light which reflects the inclination of the object to the light source can be represented by providing an object for representing reflected light to each object.

This enables more natural or real reflection to be represented corresponding to the inclination of the wall object to the light source (see 440' in FIG. 7).

The virtual object may be set to have a size which can be included in a viewing volume of the virtual camera.

Figure 8:
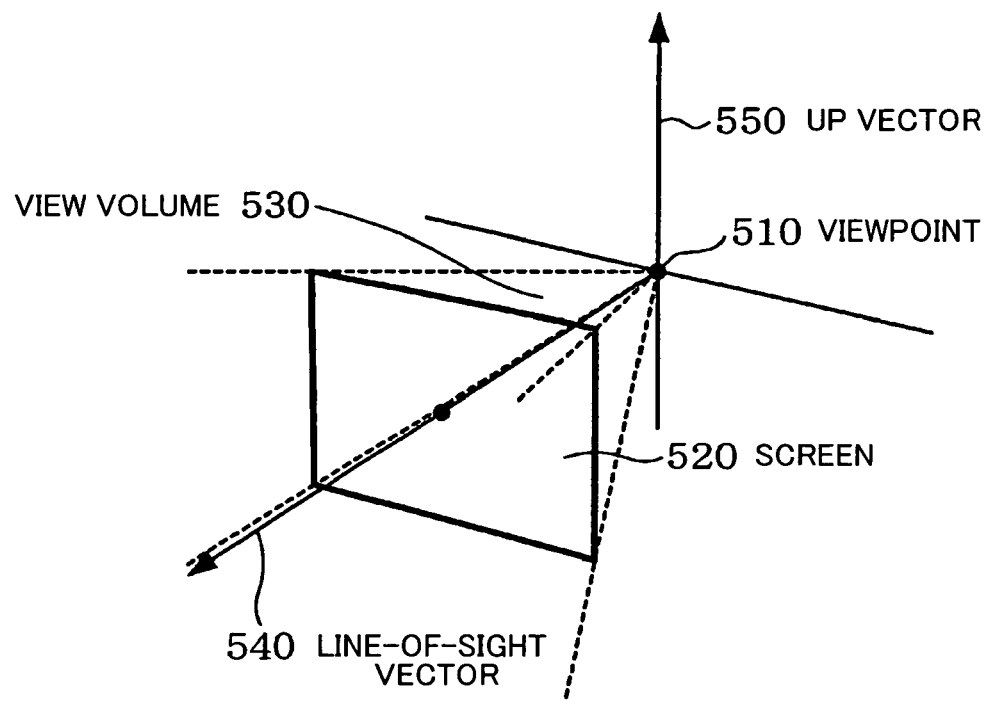
FIG. 8 is an illustrative of a viewing volume.

FIG. 8 is illustrative of a viewing volume.

A camera model (virtual camera) generally used in computer graphics is based on the principle of a pinhole camera. In this model, a position point-symmetrical to the actual film surface is called a projection surface (screen) 520 with the pinhole as a viewpoint 510, the normal direction of the screen is called a line-of-sight vector 540, the upward direction of the screen is called an up vector 550, and a tetragonal pyramid which has the viewpoint as the vertex and the screen 520 as the bottom is called a viewing volume 530.

In the present embodiment, the virtual object moves to follow the virtual camera or the player's character. However, if the viewing volume includes in the virtual object in a state in which the virtual object is disposed in the viewpoint coordinate system, the given object or topography can be necessarily included in the case where the position of the given object or topography is within the field of view by disposing the virtual object at the position of the viewpoint (position of virtual camera), for example. Since the virtual object can be disposed irrespective of the positional relationship with the position of the given object or topography, the processing can be simplified.

The background color (color of the sky, for example) may be mixed into the virtual object.

Figure 9:
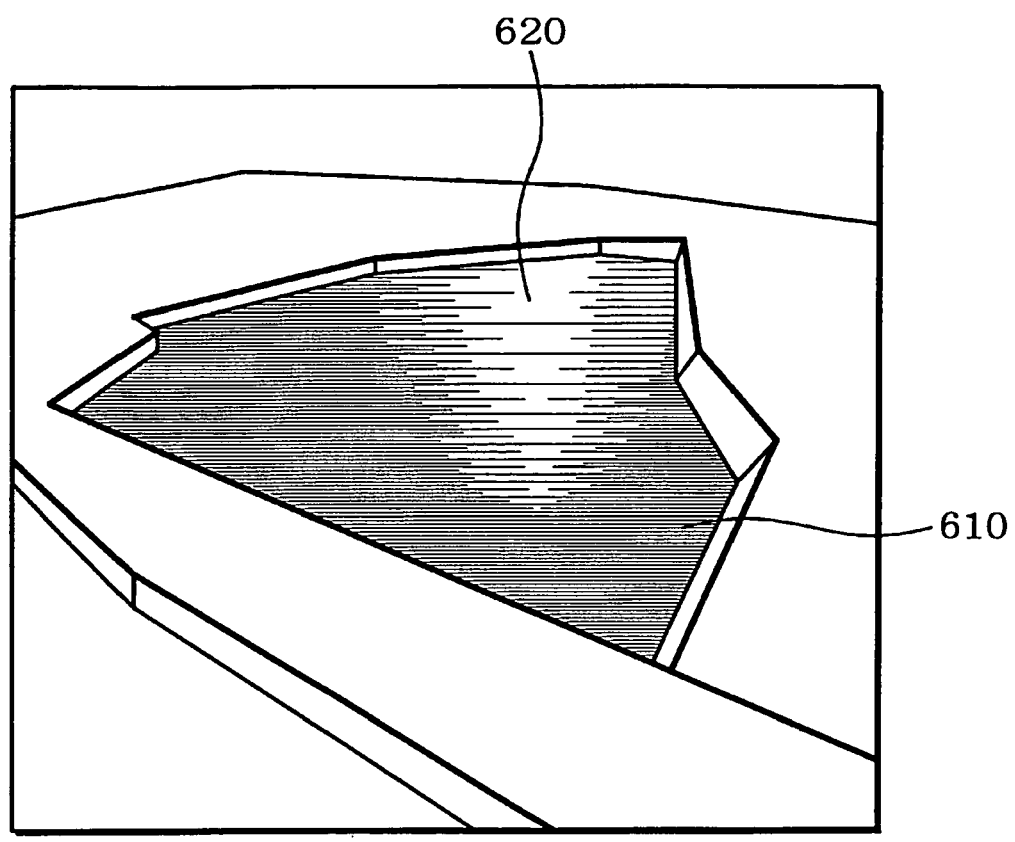
FIG. 9 shows a state in which a water surface object reflects sunlight and the color of the sky.

This enables the state in which a water surface object 610 reflects sunlight 620 and the color of the sky to be represented, as shown in FIG. 9.

The brightness or color of a predetermined area of the virtual object may be set so that the portion disposed away from the player or the virtual camera has brighter color or higher brightness. This enables a Fresnel effect to be represented in which the area away from the viewpoint is brighter and the area closer to the viewpoint is darker.

Figure 10:
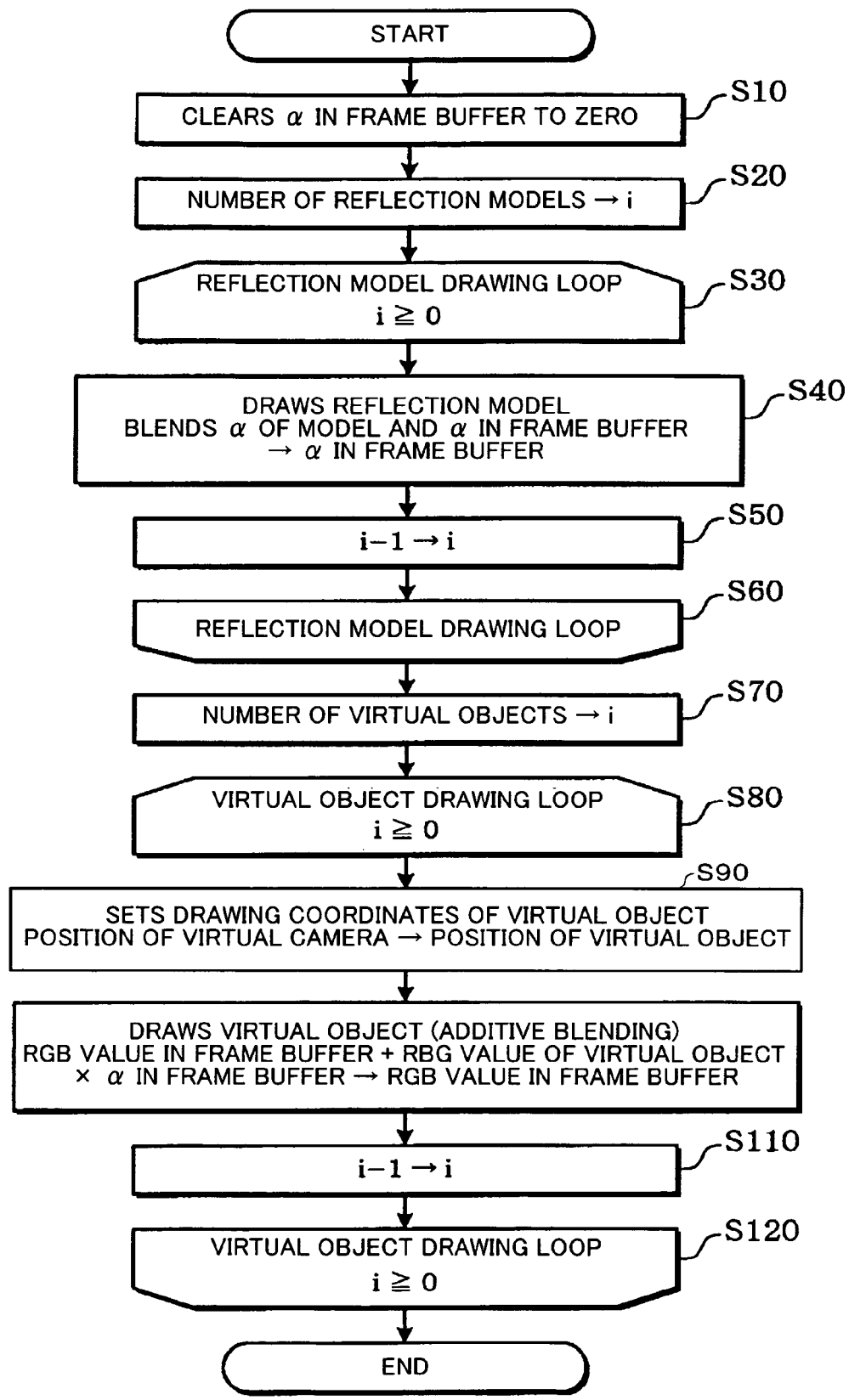
FIG. 10 is a flowchart diagram illustrating a flow of reflection image generation processing of an embodiment of the present invention.

FIG. 10 is a flowchart diagram illustrating a flow of reflection image generation processing of the present embodiment.

α in the frame buffer is cleared to zero (step S10).

The number of reflection models (given object or topographical model which represents reflection) is set at a variable i (step S20).

In steps S30 to S60, the following reflection model drawing loop processing is performed during a period in which the variable i is equal to or greater than zero.

The reflection model (i) is drawn (step S40). A value obtained by blending α of the model (α set for each pixel by interpolating α set at the vertices of the model information, for example) and α in the frame buffer is set in the α channel in the frame buffer. Then the blended α of the model may be directly set in the α channel in the frame buffer.

The variable i is decremented (step S50), and the processing in the steps S40 and S50 is repeated if the variable i is equal to or greater than zero.

The number of virtual objects (given object or topographical model which represents reflection) is set at the variable i (step S70).

In steps S80 to S120, the following virtual object drawing loop processing is performed during a period in which the variable i is equal to or greater than zero.

The position of the virtual camera is set as position coordinates of the virtual object (i) to set drawing coordinates of the virtual object (i) (step S90).

The virtual object (i) is drawn in the frame buffer by alpha-additive blending (step S100). Specifically, "RGB value of pixel (j) in frame buffer+RBG value of pixel (j) of virtual object×α of pixel (j) in frame buffer" is set as the RBG value of the pixel (j) in the frame buffer.

The variable i is decremented (step S110), and the processing in the steps S90 to S110 is repeated if the variable i is equal to or greater than zero.

4. Hardware Configuration

Figure 11:
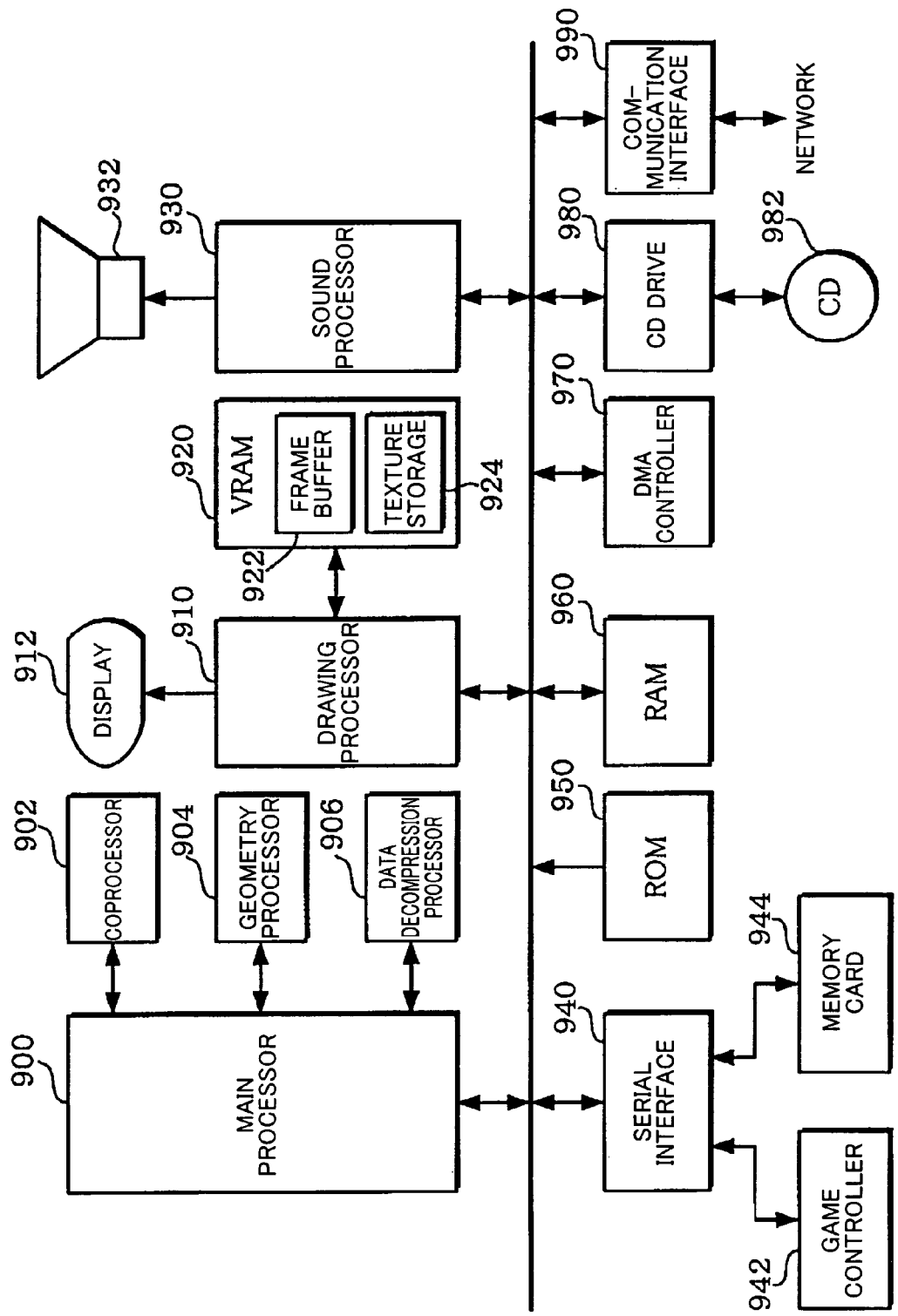
FIG. 11 shows an example of a hardware configuration which can realize an embodiment of the present invention.

An example of a hardware configuration which can realize the present embodiment is described below with reference to FIG. 11.

A main processor 900 operates based on a program stored in a CD 982 (information storage medium), a program transferred through a communication interface 990, a program stored in a ROM 950 (one of information storage media), or the like, and performs various types of processing such as game processing, image processing, and sound processing.

A coprocessor 902 assists the processing of the main processor 900. The coprocessor 902 includes a product sum calculator and a divider which can perform a high-speed parallel computation, and performs a matrix computation (vector computation) at high speed. In the case where processing such as a matrix computation is necessary for physical simulation for causing an object to move or take motion, a program which operates on the main processor 900 issues instructions to (requests) the coprocessor 902 to perform the processing.

A geometry processor 904 performs geometry processing such as a coordinate transformation, perspective transformation, light source computation, and curved surface generation. The geometry processor 904 includes a product sum calculator and a divider which can perform a high-speed parallel computation, and performs a matrix computation (vector computation) at high speed. In the case of performing processing such as a coordinate transformation, perspective transformation, or light source parallel computation, a program which operates on the main processor 900 issues instructions to the geometry processor 904 to perform the processing.

A data decompression processor 906 decodes compressed image data or sound data, or accelerates the decode processing of the main processor 900. This enables a motion picture compressed by using a given image compression method to be displayed in an opening screen, intermission screen, ending screen, or game screen. The image data or sound data to be decoded is stored in the ROM 950 or CD 982, or transferred from the outside through the communication interface 990.

A drawing processor 910 performs drawing (rendering) processing of an object formed of a primitive surface such as a polygon or a curved surface at high speed. When drawing an object, the main processor 900 delivers object data to the drawing processor 910 by utilizing the function of a DMA controller 970, and transfers a texture to a texture storage section 924, if necessary. The drawing processor 910 draws an object in a frame buffer 922 at high speed based on the object data and the texture while performing hidden surface removal by utilizing a Z buffer or the like. The drawing processor 910 also performs alpha-blending (translucent processing), depth queuing, MIP mapping, fog processing, bilinear filtering, trilinear filtering, anti-aliasing, shading, or the like. After an image for one frame is written in the frame buffer 922, the image is displayed on the display 912.

A sound processor 930 includes a multi-channel ADPCM sound source or the like, and generates high-quality game sound such as BGM, effect sound, or voice. The generated game sound is output from a speaker 932.

The operation data from the game controller 942 or saved data or personal data from the memory card 944 is transferred through a serial interface 940.

A system program or the like is stored in the ROM 950. In the case of an arcade game system, the ROM 950 functions as the information storage medium, and various programs are stored in the ROM 950. A hard disk may be used instead of the ROM 950.

A RAM 960 is used as a work area for various processors.

A DMA controller 970 controls DMA transfer between a processor and a memory (RAM, VRAM, ROM, and the like).

A CD drive 980 drives a CD 982 (information storage medium) in which a program, image data, or sound data is stored, and enables access to the program and the data.

The communication interface 990 is an interface for performing data transfer with the outside through a network. In this case, as the network connected with the communication interface 990, a communication line (analog telephone line or ISDN) or a high-speed serial bus may be used. Data transfer through the Internet can be realized by utilizing the communication line. Data transfer with another game system can be realized by utilizing the high-speed serial bus.

Each means of the present invention may be entirely executed by hardware only, or be executed by only a program stored in the information storage medium or a program distributed through the communication interface. Or, each means of the present invention may be executed by hardware and a program.

In the case of executing each means of the present invention by hardware and a program, a program for executing each means of the present invention by utilizing hardware is stored in the information storage medium. In more detail, the program issues instructions to each of the processors 902, 904, 906, 910, and 930 (hardware) to perform the processing, and transfers data if necessary. Each of the processors 902, 904, 906, 910, and 930 executes each means of the present invention based on the instructions and transferred data.

Figure 12A:
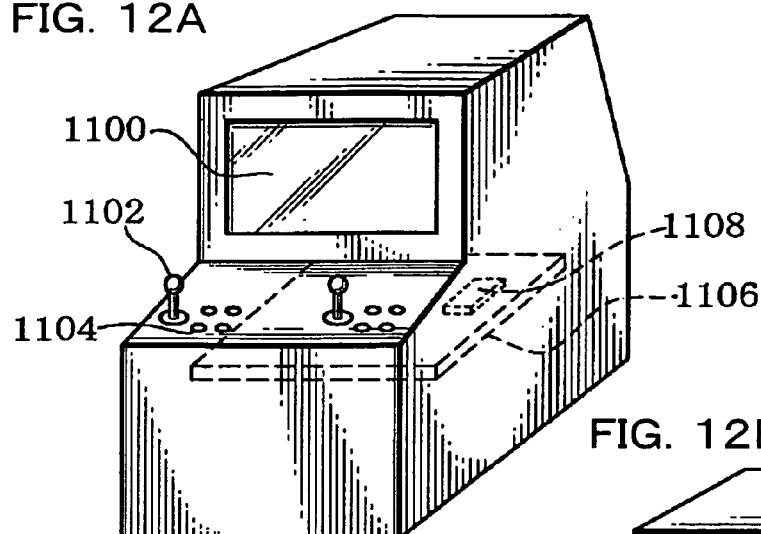
FIGS. 12A, 12B, and 12C show systems of various forms to which an embodiment of the present invention is applied.

FIG. 12A shows an example in which the present embodiment is applied to an arcade game system. A player enjoys the game by operating a lever 1102, a button 1104, and the like while watching a game image displayed on a display 1100. Various processors and memories are mounted on a built-in system board 1106 (circuit board). Information (program or data) for executing each means of the present invention is stored in a memory 1108, which is an information storage medium on the system board 1106. This information is hereinafter called stored information.

Figure 12B:
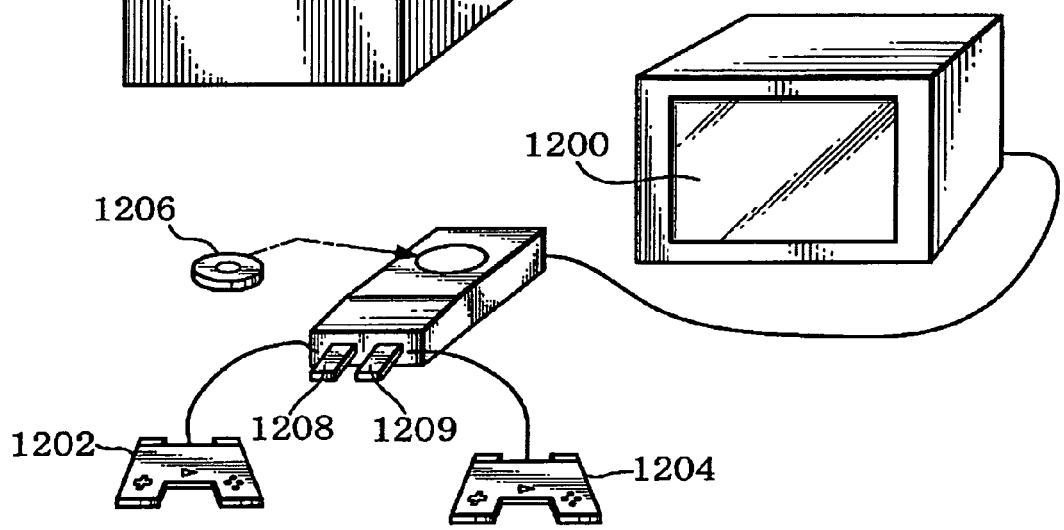

FIG. 12B shows an example in which the present embodiment is applied to a consumer game system. A player enjoys the game by operating game controllers 1202 and 1204 while watching a game image displayed on a display 1200. In this case, the stored information is stored in a CD 1206 or memory cards 1208 and 1209 which are information storage media removable from the main body of the system.

Figure 12C:
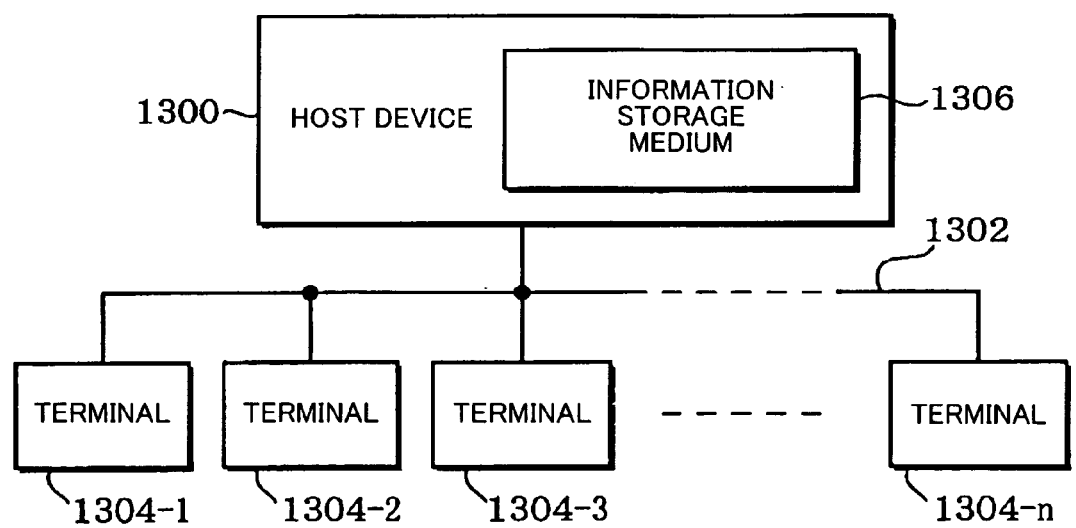
Figure 13:
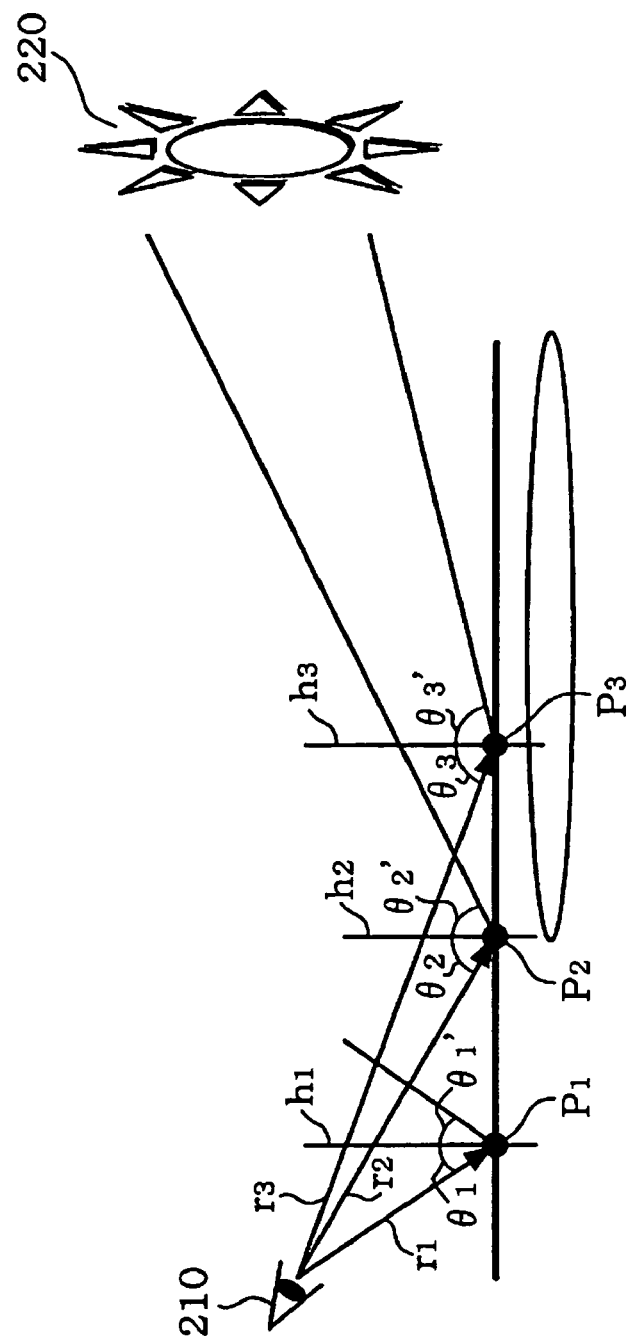
FIG. 13 is illustrative of reflection of light.

FIG. 12C shows an example in which the present embodiment is applied to a system which includes a host device 1300 and terminals 1304-1 to 1304-n connected with the host device 1300 through a network 1302 (small-scale network such as a LAN or wide area network such as the Internet). In this case, the stored information is stored in an information storage medium 1306 such as a magnetic disk device, a magnetic tape device, or a memory which can be controlled by the host device 1300, for example. In the case where the terminals 1304-1 to 1304-n can generate a game image and game sound by themselves, a game program for generating a game image and game sound is transferred to the terminals 1304-1 to 1304-n from the host device 1300. In the case where the terminals 1304-1 to 1304-n cannot generate the game image and game sound by themselves, the host device 1300 generates the game image and game sound, and transfers the game image and game sound to the terminals 1304-1 to 1304-n. The terminals 1304-1 to 1304-n output the transferred game image and game sound.

In the configuration shown in FIG. 12C, each means of the present invention may be distributed and executed by the host device (server) and the terminal. The stored information for executing each means of the present invention may be distributed and stored in the information storage medium of the host device (server) and the information storage medium of the terminal.

The terminal connected with the network may be a consumer game system or an arcade game system. In the case of connecting the arcade game system with the network, it is preferable to use an information storage device for saving (memory card or portable game device), which can exchange information with the arcade game system and the consumer game system.

The present invention is not limited to the above-described embodiment. Various modifications and variations are possible.

The invention according to the dependent claims may have a configuration in which a part of the constituent elements of the claim on which the invention is dependent is omitted, for example. It is possible to allow the feature of the invention according to one independent claim to depend on another independent claim.

The present embodiment illustrates the case of employing the RGB system as an example. However, the present invention is not limited thereto.

The present invention may be applied to the case of using other color systems such as an HSV system, HLS system, or CMYK system.

The present embodiment illustrates the case where the virtual object has the shape of a bowl or a disk as an example. However, the present invention is not limited thereto. The virtual object may have another shape.

The present invention may be applied to various games (fighting game, competitive game, shooting game, robot fighting game, sport game, role playing game, music playing game, dance game, and the like).

The present invention may be applied to various game systems such as an arcade game system, consumer game system, large-scale attraction system in which a number of players participate, simulator, multimedia terminal, and system board which generates a game image.

What is claimed is:

1. An image generation method comprising:
    assigning, to a given object or a given topographic surface disposed in a virtual three-dimensional space, a virtual object which has at least one of nonuniform brightness or nonuniform color and is used for representing a light reflection effect on the object or the topographic surface, and storing the virtual object in a storage section;
    determining a position of the virtual object so that the virtual object moves to follow a virtual camera or a player's character, and disposing the virtual object at the determined position; and
    generating and displaying an image of the virtual three-dimensional space viewed from the virtual camera by performing translucent blending processing of the object or the topographic surface and the virtual object assigned to the object or the topographic surface,
    wherein brightness or color of a predetermined area of the virtual object is set so that a portion disposed further from a player or the virtual camera has higher brightness or brighter color.

2. The image generation method as defined in claim 1, wherein a background color is mixed into the virtual object.

3. The image generation method as defined in claim 1, wherein the virtual object is assigned to have a size to be included in a viewing volume of the virtual camera.

4. The image generation method as defined in claim 1, wherein the virtual object has a shape of a part of a spherical surface or a shape of a bowl.

5. The image generation method as defined in claim 1, wherein, in a case of representing reflection on a plurality of objects or topographic surfaces, the virtual object is assigned to each of the plurality of objects or topographic surfaces.

6. The image generation method as defined in claim 1, wherein a translucent blending coefficient with the virtual object is stored for each vertex as model information of the object or the topographic surface, and
    wherein the translucent blending processing of the object or the topographic surface and the virtual object is performed using the translucent blending coefficient.

7. The image generation method as defined in claim 1, wherein a translucent blending coefficient with the virtual object is stored for each pixel as information of a texture to be mapped on the object or the topographic surface, and
    wherein the translucent blending processing of the object or the topographic surface, on which the texture is mapped, and the virtual object is performed using the translucent blending coefficient.

8. A program executed on a computer to implement processing of:
    assigning, to a given object or a given topographic surface disposed in a virtual three-dimensional space, a virtual object which has at least one of nonuniform brightness or nonuniform color and is used for representing a light reflection effect on the object or the topographic surface;
    determining a position of the virtual object so that the virtual object moves to follow a virtual camera or a player's character, and disposing the virtual object at the determined position; and generating and displaying an image of the virtual three-dimensional space viewed from the virtual camera by performing translucent blending processing of the object or the topographic surface and the virtual object assigned to the object or the topographic surface, wherein brightness or color of a predetermined area of the virtual object is set so that a portion disposed further from a player or the virtual camera has higher brightness or brighter color.

9. The program as defined in claim 8,
wherein a background color is mixed into the virtual object.

10. The program as defined in claim 8,
wherein the virtual object is assigned to have a size to be included in a viewing volume of the virtual camera.

11. The program as defined in claim 8,
wherein the virtual object has a shape of a part of a spherical surface or a shape of a bowl.

12. The program as defined in claim 8,
wherein, in a case of representing reflection on a plurality of objects or topographic surfaces, the virtual object is assigned to each of the plurality of objects or topographic surfaces.

13. The program as defined in claim 8,
wherein a translucent blending coefficient with the virtual object is stored for each vertex as model information of the object or the topographic surface, and
wherein the translucent blending processing of the object or the topographic surface and the virtual object is performed using the translucent blending coefficient.

14. The program as defined in claim 8,
wherein a translucent blending coefficient with the virtual object is stored for each pixel as information of a texture to be mapped on the object or the topographic surface, and
wherein the translucent blending processing of the object or the topographic surface, on which the texture is mapped, and the virtual object is performed using the translucent blending coefficient.

15. A computer-readable information storage medium which stores a program defined in claim 8.

16. An image generation system comprising:
a virtual object assigning section which assigns, to a given object or a given topographic surface disposed in a virtual three-dimensional space, a virtual object which has at least one of nonuniform brightness or nonuniform color and is used for representing a light reflection effect on the object or the topographic surface;
a virtual object disposing section which determines a position of the virtual object so that the virtual object moves to follow a virtual camera or a player's character, and disposes the virtual object at the determined position; and
an image generation and displaying section which generates and displays an image of the virtual three-dimensional space viewed from the virtual camera by performing translucent blending processing of the object or the topographic surface and the virtual object assigned to the object or the topographic surface,
wherein brightness or color of a predetermined area of the virtual object is set so that a portion disposed further from a player or the virtual camera has higher brightness or brighter color.

17. The image generation system as defined in claim 16,
wherein a background color is mixed into the virtual object.

18. The image generation system as defined in claim 16,
wherein the virtual object is assigned to have a size to be included in a viewing volume of the virtual camera.

19. The image generation system as defined in claim 16,
wherein the virtual object has a shape of a part of a spherical surface or a shape of a bowl.

20. The image generation system as defined in claim 16,
wherein, in a case of representing reflection on a plurality of objects or topographic surfaces, the virtual object is assigned to each of the plurality of objects or topographic surfaces.

21. The image generation system as defined in claim 16,
wherein a translucent blending coefficient with the virtual object is stored for each vertex as model information of the object or the topographic surface, and
wherein the translucent blending processing of the object or the topographic surface and the virtual object is performed using the translucent blending coefficient.

22. The image generation system as defined in claim 16,
wherein a translucent blending coefficient with the virtual object is stored for each pixel as information of a texture to be mapped on the object or the topographic surface, and
wherein the translucent blending processing of the object or the topographic surface, on which the texture is mapped, and the virtual object is performed using the translucent blending coefficient.

* * * * *